United States Patent [19]
Leisinger et al.

[11] Patent Number: 5,646,409
[45] Date of Patent: Jul. 8, 1997

[54] METHOD OF SUPPRESSING EXTRANEOUS RADIATION EFFECTS IN RADIOACTIVE MEASURING METHODS

[75] Inventors: Ulrich Leisinger; Joachim Neuhaus, both of Lörrach, Germany

[73] Assignee: Endress & Hauser GmbH & Co., Maulburg, Germany

[21] Appl. No.: 611,523

[22] Filed: Mar. 6, 1996

Related U.S. Application Data

[63] Continuation of Ser. No. 244,593, filed as PCT/EP93/02589, Sep. 23, 1993 published as WO94/08255, Apr. 14, 1994, abandoned.

[30] Foreign Application Priority Data

Oct. 2, 1992 [DE] Germany ............ 42 33 278.8

[51] Int. Cl.$^6$ ............................................. G01N 23/00
[52] U.S. Cl. ................ 250/395; 250/369; 250/393
[58] Field of Search ................ 250/336.1, 252.1 R, 250/252.1 A, 369, 393, 395, 357.1

[56] References Cited

U.S. PATENT DOCUMENTS

| | | | |
|---|---|---|---|
| 3,246,150 | 4/1966 | Stoddart et al. | 250/369 |
| 3,859,532 | 1/1975 | Luitwieler | 250/369 |
| 4,348,588 | 9/1982 | Yrjönen et al. | 250/252.1 R |

FOREIGN PATENT DOCUMENTS 56-155380  4/1980  Japan.

*Primary Examiner*—Carolyn E. Fields
*Assistant Examiner*—Edward J. Glick
*Attorney, Agent, or Firm*—Bose McKinney & Evans

[57] ABSTRACT

The instant invention relates to a method to compensate for extraneous radiation caused by the effects of intermittent active radiation sources (not effects due to cosmic or terrestrial radiation) that can cause errors in radiation measured values. For the purposes of suppressing these extraneous radiation effects in radio-active measuring methods, the commencement and termination of the extraneous radiation and the attainment of a stable condition in the extraneous radiation are determined. The difference between the measured value (before commencement of the extraneous radiation) and the measured value (on attainment of the stable condition) is determined. The measured value is then reduced by the determined difference for the duration of the extraneous radiation. Since the determined difference corresponds to the change in the measured result brought about by the extraneous radiation, the resultant measured value obtained by this reduction, equals the measured value that would be obtained in the absence of the extraneous radiation.

26 Claims, 2 Drawing Sheets phy
METHOD OF SUPPRESSING EXTRANEOUS RADIATION EFFECTS IN RADIOACTIVE MEASURING METHODS This is a continuation of application Ser. No. 08/244,593, filed as PCT/EP93/02589, Sep. 23, 1993 published as WO94/08255, Apr. 14, 1994, now abandoned.

FIELD OF THE INVENTION

The invention relates to a method of suppressing extraneous radiation effects in radioactive measuring methods.

BACKGROUND OF THE INVENTION

In radioactive measuring methods involving the use of X-rays or gamma rays for example, for measuring densities, content levels or flow rates, or for monitoring limiting levels the effects of extraneous radiation cause faulty measurements. The term "extraneous radiation" does not refer to background radiation in the form of cosmic or terrestrial radiation, but rather the effects of intermittently active radiation sources which are used, for example, in the course of non-destructive testing of materials (gamma-graphics, back-scattering examinations) as well as X-ray diagnostics, etc. The occurrence of such extraneous radiation may be detected by auxiliary radiation detectors which are not exposed to the measuring radiation or by the corruptions of the measurement result caused by it. It is known to detect and indicate the commencement and termination of an extraneous radiation in order to alert the user of the measuring method that the measured value is being distorted by extraneous radiation. It is not feasible, however, to obtain a valid measuring result from the radioactive measurement while the extraneous radiation subsists.

OBJECTS AND SUMMARY OF THE INVENTION

The invention has as its object the provision of a method whereby the effects of extraneous radiation in a radio-active measuring method can be suppressed in such a manner that the measurement can continue even for the duration of the extraneous radiation and produce valid results.

This object is attained according to the invention in that the difference between the measured result before commencement of the extraneous radiation, and the measured result after the extraneous radiation has attained a stable condition is determined, and that for the duration of the extraneous radiation the measured result is decreased by the calculated difference.

In the method according to the invention a resultant measurement is obtained during the subsistence of the extraneous radiation from which the effect of the extraneous radiation, as determined after having attained a stable condition, has been eliminated. Since this effect no longer varies after the attainment of the stable condition, the measured value corresponds solely to the portion attributable to the measuring radiation. The resultant measured value accordingly equals the measured result that would have been obtained in the absence of the extraneous radiation.

It may happen in certain applications of extraneous radiation sources that the stable condition is not immediately attained after commencement of the extraneous radiation. This applies for example in gamma-graphics when the radiation source is transferred from the radiation-proof vessel into the collimator, causing a high, localized peak dosage to occur, and the stable condition is only attained when the radiation source is located in the collimator. In order to permit continuing the radioactive measurement even during such transitional conditions, provision is made in accordance with a further development of the inventive concept, for calculating a theoretical measured value between the commencement of the extraneous radiation and the attainment of a stable condition.

Further advantageous embodiments and improvements of the invention are characterized in the subsidiary claims.

Further features and advantages of the invention will be apparent from the following description of an embodiment with reference to the drawings. In the drawings:

DETAILED DESCRIPTION OF THE DRAWINGS

Figure 1:
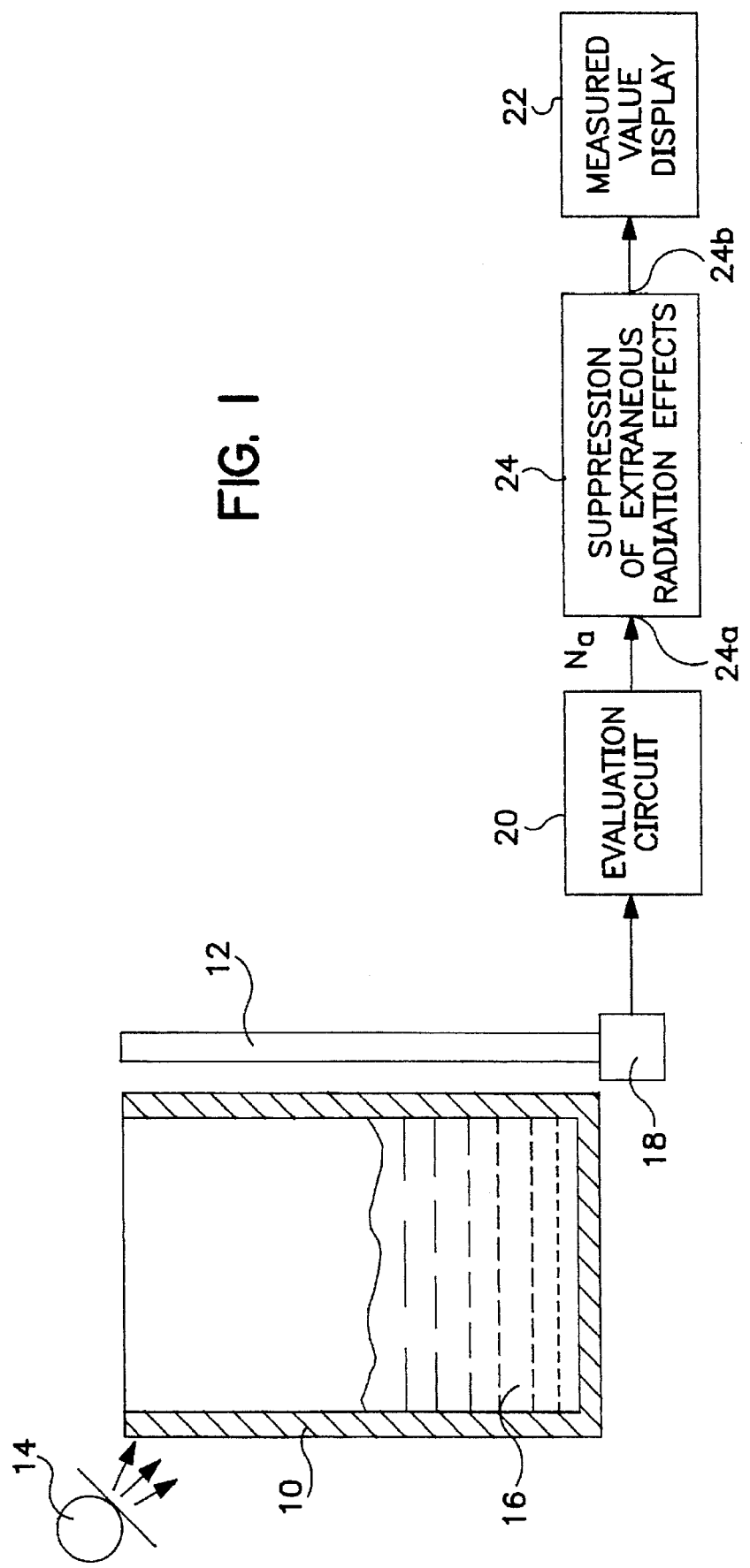
FIG. 1 shows an arrangement for radioactive measurement of the filling level in a vessel.

FIG. 1 shows an example of an application of a method according to the invention for measuring the filling level in a vessel 10. A plastic scintillator 12 is arranged at one side of the vessel 10, and extends along the entire height along which the level is to be measured. A gamma-ray source 14 is located at the opposing side of the vessel 10, having its radiation directed across the vessel 10 and its contents 16 towards the plastic scintillator 12. The gamma radiation is absorbed more strongly by the contents 16 than by the air above it, so that the intensity of the gamma radiation impinging on the plastic scintillator 12 is dependent on the filling level in the vessel. The number and intensity of light flashes occurring in the plastic scintillator 12 as a result of the gamma radiation is accordingly dependent on the filling level in the vessel 10.

A photoelectric transducer 18, customarily a photoelectron multiplier for converting each impinging light flash into an electric pulse is located at one end of the plastic scintillator 12 for detecting and evaluating the light flashes produced in the plastic scintillator. The output of the photoelectron multiplier 18 is connected to an electronic evaluation circuit 20 whereby, at predetermined time intervals, those electric pulses are counted the amplitudes of which exceed a predetermined discriminator threshold. The evaluation circuit 20 transmits to an output, the number of pulses $N_a$ counted during each interval, which immediately provides a value for the filling level in the vessel 10, which may, for example, be displayed by a measured value display 22.

In FIG. 1 an arrangement 24 for suppressing the influences of extraneous radiation is interposed between the output of the evaluation circuit 20 and the measured value display 22. The term "extraneous radiation" does not refer to the background radiation in the form of cosmic and terrestrial radiation; this radiation is substantially constant and can be taken into account with the indication of a measured result. The arrangement 24 serves rather to suppress the effect of sporadically active radiation sources as are used for example during the non-destructive testing of materials (gamma-graphics, back-scattering examinations, etc.) and also during X-ray diagnostics. The application of high-energy particle radiation is also detected as extraneous radiation. Whenever such extraneous radiation strikes the plastic scintillator 12 it causes additional light flashes which are included in the computation by the evaluation circuit 20, thereby altering the pulse number $N_a$, although the filling level remains constant. By indicating this altered pulse number the measured value would be distorted. The arrangement 24 makes it feasible to continue indicating the correct filling level notwithstanding the presence of extraneous radiation.

Figure 2:
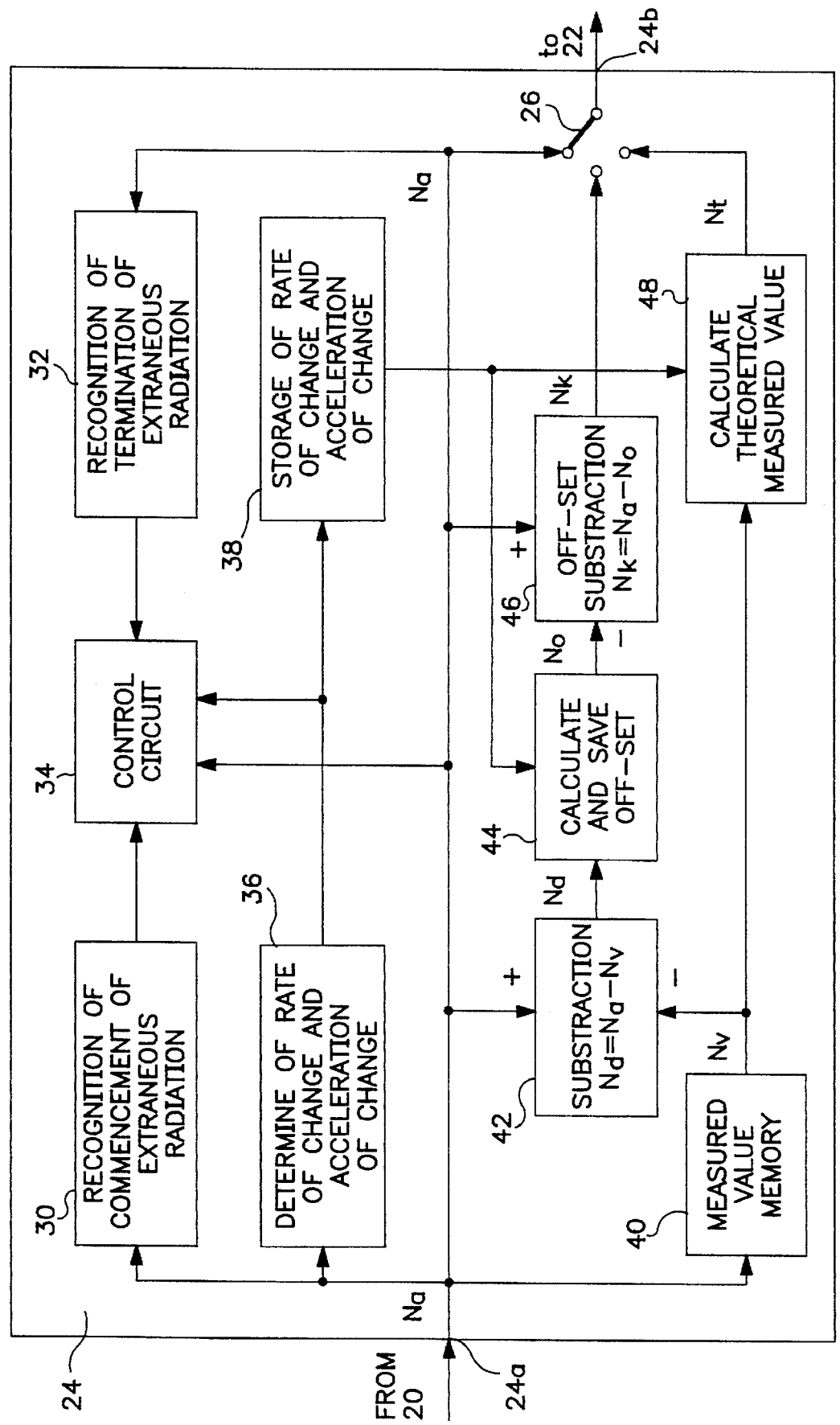
FIG. 2 shows a block diagram of the arrangement set out in FIG. 1 for suppressing extraneous radiation influences.

The mode of operation of the arrangement 24 is elucidated with reference to the block diagram of FIG. 2. FIG. 2 shows the input 24a to the arrangement 24, which at any time receives the current pulse count $N_a$ from the output of the evaluation circuit 20, and the output 24b of the arrangement 24, which is connected to the measured value display 22. A change-over switch 26 is arranged between the input 24a and the output 24b, which connects the input 24a directly to the output 24b when set in the position shown in FIG. 2. In this position of the change-over switch 26 the current pulse count $N_a$ is accordingly transferred to the measured value display 22 without alteration. This corresponds to operation of the arrangement 24 in the absence of any extraneous radiation.

In order to suppress extraneous radiation effects it is necessary to recognise the commencement and the termination of the extraneous radiation. The arrangement 24 hence includes a functional block 30 for recognising the commencement of the extraneous radiation, and a functional block 32 for recognising the termination of the extraneous radiation. The outputs of these functional blocks are connected to a control circuit 34, which controls all functions of the arrangement 24 whenever an occurrence of extraneous radiation has been detected.

In FIG. 2 the functional blocks 30 and 32 receive the current pulse count $N_a$ from the input 24a; they are designed so as to detect the commencement and the termination, as the case may be, of extraneous radiation from changes in the pulse count $N_a$. Certain phenomena which occur when using extraneous radiation sources may be utilized to recognize extraneous radiation. In the case of non-destructive material testing by means of gamma-graphics for example, the transfer of the radiation source from the radiation-proof container to the collimator, and also the transfer of the radiation source from the collimator to the radiation-proof vessel each cause a brief spike of very high localized intensity whereas the localized intensity between these two operations, although being lower than the peak values nevertheless remains higher than the radiation intensity emanating from the gamma-ray source 14 alone.

The commencement and termination of the extraneous radiation may accordingly be detected by the functional blocks 30 and 32 from the actual pulse count $N_a$ according to one of the following criteria:

by detecting a local radiation intensity which exceeds the maximum attainable local radiation intensity of the gamma-ray source 14;

by recognizing a rapid variation in the local radiation intensity, which cannot be process-related;

by reason of a detection of an over-modulation of the radiation detector.

Instead of detecting the commencement and termination of extraneous radiation as a result of changes in the measured values, being the actual pulse count $N_a$ for each time interval, it is likewise feasible to provide for this purpose, a further radiation detector, which is not exposed to the operational radiation of the gamma-ray source 14. In order to implement this option in the arrangement 24 the inputs of the functional blocks 30 and 32 are simply connected to the further radiation detector instead of to the input 24a. The mode of operation of the arrangement remains unchanged.

A functional block 36 determines the rate of change and the acceleration of change of the measured value by means of the current consecutive pulse counts $N_a$. The detected values are stored in a functional block 38 and also fed to the control circuit 34, which additionally receives the current pulse count $N_a$.

Each current pulse count $N_a$ is further fed to a measured value memory 40, where it is stored. The pulse count $N_v$, determined and stored during the preceding time interval, is made available at the output of the measured value memory. A functional block 42 is able to determine a differential pulse value $N_d$ by subtracting the preceding pulse count $N_v$ from the actual pulse count $N_a$:

$$N_d = N_a - N_v.$$

A functional block 44 calculates from the differential pulse count $N_d$ and the values of the rate of change and the acceleration of change stored in the functional block 38 an off-set pulse count $N_o$, which is stored in the functional block 44. By subtracting the off-set pulse count $N_o$ from the actual pulse count $N_a$ a functional block 46 produces a corrected pulse count $N_k$:

$$N_k = N_a - N_o.$$

Finally a functional block 48 is capable of calculating a theoretical measured value Nt from the pulse count $N_v$ stored in the measured value memory 40 and the values for the rate of change and acceleration of change stored in the functional block 38.

The outputs of the functional blocks 46 and 48 are connected to additional switch contacts of the change-over switch 26.

The functions described above are controlled by the control circuit 34. The required connections between the control circuit 34 and the various functional blocks are not shown in FIG. 2 for greater clarity of the block diagram.

As already mentioned above, the switch 26 is set in the position shown in FIG. 2 when no extraneous radiation occurs, so that the current pulse counts Na are transferred directly to the level indicator 22.

Whenever the functional block 30 recognizes the commencement of an extraneous radiation according to one of the criteria set out above, the control circuit 34 blocks the measured value memory 40 so that the subsequent pulse counts $N_a$ are no longer stored and the last preceding pulse count $N_v$, which was detected before the occurrence of the extraneous radiation, remains stored in the measured value memory. The control circuit 34 furthermore blocks the functional block 38 so that the last values of the rate of change and the acceleration of change, determined before the occurrence of the extraneous radiation, remain stored.

The control circuit 34 further verifies whether the actual pulse count $N_a$ and the values of the rate of change and acceleration of change determined by the functional block 36 lie within predetermined limits in order to determine whether the extraneous radiation has reached a stable condition. Depending on the result of this evaluation the following may occur:

If the pulse count and/or the rate of change and/or the acceleration of change exceeds the predetermined limits (which will particularly be the case for the example of gamma-graphics as described above during transfer of the radiation source from the radiation-proof container to a collimator), the control circuit 34 causes the functional block 48 to calculate theoretical pulse counts $N_t$ using the most recently stored pulse count $N_v$ and the stored values of the rate of change and the acceleration of change, while the calculated theoretical pulse counts are developed further in accordance with the stored values of the rate of change and the acceleration of change. The control circuit 34 simultaneously sets the change-over switch 26 in the position in which it links the level indicator 22 to the output of the functional block 48 thereby causing the calculated theoretical pulse counts $N_t$ to be used as displayed measured values.

As soon as the current pulse count $N_a$, the rate of change and the acceleration of change all fall within their predetermined limits (as would be the case with gamma-graphics when the radiation source is located in the collimator) the control circuit 34 causes the calculation of the differential pulse count $N_d$ by the functional block 42, the calculation and storage of an off-set pulse count $N_o$ by the functional block 44 and a continuous calculation of a corrected pulse count $N_k$ by subtraction of the stored off-set pulse count $N_o$ from the respective current pulse count $N_a$ by means of the functional block 46. At the same time the control circuit 34 sets the change-over switch 26 in the position in which the measured value display 22 is connected to the output of the functional block 46, so that the corrected pulse counts $N_k$ are used to display measured values.

The off-set pulse count $N_o$ is calculated in the functional block 46 in such a manner that it corresponds to the difference between the current pulse count $N_a$ and the most recent pulse count immediately preceding the recognition of the extraneous radiation, extrapolated to the time of the calculation. The time of the calculation differs from the time of the recognition of the extraneous radiation by the time required for calculating and, where applicable, by the time required to attain a stable condition. If the extraneous radiation has already attained a stable condition at the time of recognition and the time for calculating is negligible, then the off-set pulse count $N_o$ equals the differential pulse count $N_d$. If these time periods are not negligible, while the rate of change and the acceleration of change which are stored in the functional block 38 are both zero, however, then the off-set pulse count $N_o$ again equals the differential pulse count $N_d$ since the pulse count which would then be obtained in the absence of extraneous radiation effects during the calculation, would not have changed in relation to the most recently stored pulse count $N_v$. In all other cases the functional block 44 corrects the off-set pulse count $N_o$ with reference to the change which the stored pulse count $N_v$ would have undergone as a result of the rate of change and acceleration of change stored in the functional block 46 up to the time of calculation.

As soon as the functional block 32 detects the termination of the extraneous radiation these procedures take place in the reverse sequence so that in the course of the withdrawal of the radiation source from the collimator the theoretical pulse counts $N_t$ are used temporarily and on termination of the extraneous radiation the actual pulse counts $N_a$ are used again for the measured value display.

Disregarding the brief transient conditions during the insertion and withdrawal of extraneous radiation sources the function of the arrangement 24 is based on the following principle:

as soon as a recognized extraneous radiation has reached a stable condition the difference between the measured values with and without the extraneous radiation ("off-set") is determined;

measured values reduced by the derived difference are used instead of the actually measured values for the purposes of measured value display for the duration of the extraneous radiation.

In this manner the measured values for the duration of the extraneous radiation are displayed in such a manner as if the extraneous radiation did not exist.

The brief interposing of theoretically calculated measured values merely serves to bridge the transitional conditions during which a determination of the off-set value is not yet feasible. This interposing of theoretical measured values is dispensed with if such transitional conditions do not occur. It would also be feasible for the sake of simplification to simply indicate the last valid measured value for the duration of the transitional conditions.

Various modifications of the described method are feasible. The derivation and storage of the off-set pulse count $N_o$ may be initiated for example after a predetermined time interval has elapsed from the recognition of the extraneous radiation. This possibility presents itself in particular if the performance with time of the extraneous radiation source is known.

The described method is naturally not confined in its application to level measurement. Other application fields include, for example, radio-active measuring methods for the measurement of density, flow rate or limit level detection.

According to the present state of the art the functional blocks shown in FIG. 2 are not as a rule constituted by discrete electronic circuits but rather are effected by suitably programming a computer.

We claim:

1. A method of suppressing extraneous radiation effects in radioactive measuring methods which use irradiation by a radioactive source and which continually provide a measured value of radiation; said method of suppressing comprising:

calculating a difference between a measured value immediately before the commencement of a period of extraneous radiation and a measured value during the period of extraneous radiation but after the extraneous radiation has attained a stable condition; and then, for the duration of the period of extraneous radiation, decreasing the continually measured value by the calculated difference.

2. A method according to claim 1, wherein during a period of absence of the extraneous radiation, the continually provided measured value is continuously stored and the most recently stored continually provided measured value is used as the measured value immediately before the commencement for calculating the difference.

3. A method according to claim 2, wherein a rate of change and an acceleration of change in the continually provided measured value before the commencement of the period of extraneous radiation are determined and stored, and wherein the most recently continually provided measured value is extrapolated to the time of calculating the difference by taking into account the stored rate of change and acceleration of change of the continually provided measured value.

4. A method according to claim 3, wherein the calculation of the difference is made dependent on testing for the attainment of a stable condition in the extraneous radiation.

5. A method according to claim 3, wherein a theoretical measured value is calculated between the commencement of the period of extraneous radiation and the attainment of the stable condition.

6. A method according to claim 3, wherein the commencement and/or the termination of the period of extraneous radiation is recognized through changes in the continually provided measured value.

7. A method according to claim 3, wherein the commencement and/or the termination of the period of extraneous radiation is recognized by means of radiation detectors which are not exposed to the radioactive source.

8. A method according to claim 2, wherein the calculation of the difference is made dependent on testing for the attainment of a stable condition in the extraneous radiation.

9. A method according to claim 2, wherein the calculation of the difference is initiated on expiry of a predetermined time interval following the recognition of the commencement of the period of extraneous radiation.

10. A method according to claim 2, wherein a theoretical measured value is calculated between the commencement of the period of extraneous radiation and the attainment of the stable condition.

11. A method according to claim 2, wherein the commencement and/or the termination of the period of extraneous radiation is recognized through changes in the continually provided measured value.

12. A method according to claim 2, wherein the commencement and/or the termination of the period of extraneous radiation is recognized by means of further radiation detectors which are not exposed to the radioactive source.

13. A method according to claim 1, wherein the calculation of the difference is made dependent on testing for the attainment of a stable condition in the extraneous radiation.

14. A method according to claim 13, wherein the attainment of the stable condition in the extraneous radiation is determined by checking a rate of change and/or an acceleration of change in the continually provided measured value.

15. A method according to claim 14, wherein a theoretical measured value is calculated between the commencement of the period of extraneous radiation and the attainment of the stable condition.

16. A method according to claim 14, wherein the commencement and/or the termination of the period of extraneous radiation is recognized through changes in the continually provided measured value.

17. A method according to claim 14, wherein the commencement and/or the termination of the period of extraneous radiation is recognized by means of radiation detectors which are not exposed to the radioactive source.

18. A method according to claim 13, wherein a theoretical measured value is calculated between the commencement of the period of extraneous radiation and the attainment of the stable condition.

19. A method according to claim 13, wherein the commencement and/or the termination of the period of extraneous radiation is recpgnized through changes in the continually provided measured value.

20. A method according to claim 13, wherein the commencement and/or the termination of the period of extraneous radiation is recognized by means of radiation detectors which are not exposed to the radioactive source.

21. A method according to claim 1, wherein the calculation of the difference is initiated on expiry of a predetermined time interval following the recognition of the commencement of the period of extraneous radiation.

22. A method according to claim 1, wherein a theoretical measured value is calculated between the commencement of the period of extraneous radiation and the attainment of the stable condition.

23. A method according to claim 1, wherein the commencement and/or the termination of the period of extraneous radiation is recognized through changes in the continually provided measured value.

24. A method according to claim 23, wherein the commencement of the period of extraneous radiation is recognized by the continually provided measured value exceeding a maximum possible measured value.

25. A method according to claim 23, wherein the commencement and/or termination of the period of extraneous radiation is recognized by a rate of change and/or an acceleration of change in the continually provided measured value, which cannot be related to the radioactive source.

26. A method according to claim 1, wherein the commencement and/or termination of the extraneous radiation is recognized by means of radiation detectors which are not exposed to the radioactive source.

* * * * *